(12) United States Patent
McClean et al.

(10) Patent No.: US 10,277,529 B2
(45) Date of Patent: Apr. 30, 2019

(54) VISUALIZATION OF COMPUTER RESOURCE QUOTAS

(71) Applicant: LinkedIn Corporation, Mountain View, CA (US)

(72) Inventors: John A. McClean, Mountain View, CA (US); Congrui Ji, Los Altos, CA (US); Lei Gao, San Ramon, CA (US); Gustaf Johan Roger Helgesson, San Francisco, CA (US); Brent D. Miller, Sunnyvale, CA (US); Yan Yu, Cupertino, CA (US); Maverick Shu-Bun Lee, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/076,208

(22) Filed: Mar. 21, 2016

(65) Prior Publication Data

US 2017/0272379 A1 Sep. 21, 2017

(51) Int. Cl.
*H04L 29/06* (2006.01)
*H04L 12/911* (2013.01)
*H04L 12/24* (2006.01)
*G06T 11/20* (2006.01)
*G06F 21/31* (2013.01)
*H04L 12/26* (2006.01)

(52) U.S. Cl.
CPC ............ *H04L 47/781* (2013.01); *G06F 21/31* (2013.01); *G06T 11/206* (2013.01); *H04L 41/22* (2013.01); *H04L 41/5032* (2013.01); *H04L 43/08* (2013.01); *H04L 63/12* (2013.01); *H04L 65/1033* (2013.01)

(58) Field of Classification Search
CPC .. H04L 63/10; H04L 63/12; A63F 2300/5586; G06F 2209/504; G06F 21/31; G06F 21/41
See application file for complete search history.

(56) References Cited

U.S. PATENT DOCUMENTS 6,832,248 B1 * 12/2004 Byrnes .................... H04L 29/06
707/999.001
7,783,666 B1 8/2010 Zhuge
(Continued)

OTHER PUBLICATIONS

"Non Final Office Action Issued in U.S. Appl. No. 15/076,195", dated Dec. 19, 2017, 8 Pages.
(Continued)

*Primary Examiner* — Chirag R Patel
(74) *Attorney, Agent, or Firm* — Park, Vaughan, Fleming & Dowler LLP (57) ABSTRACT

A system, method, and apparatus are provided for visualizing quotas on resources within a computing environment (e.g., a data center, a computing cluster) that includes multiple brokers, gateway servers, or other entities that control access to the resource(s). Through a visualization interface, an operator of a quota system can set, change, and/or delete quotas on resources and/or sub-resources for any number of clients or consumers of the resources. The visualization interface may also enable access to a log of changes to quotas and/or graphs or other displays of statuses of any selected quotas for any selected clients and resources/sub-resources.

20 Claims, 7 Drawing Sheets

(56) References Cited

U.S. PATENT DOCUMENTS

| | | | |
|---|---|---|---|
| 9,244,894 B1* | 1/2016 | Dale | G06F 17/2235 |
| 9,741,046 B2 | 8/2017 | Abdelrahman et al. | |
| 10,063,601 B2 | 8/2018 | Yu et al. | |
| 2006/0117070 A1* | 6/2006 | Thind | G06F 17/30067 |
| 2006/0117135 A1* | 6/2006 | Thind | G06F 3/0605 |
| | | | 711/112 |
| 2008/0313715 A1 | 12/2008 | Nardone et al. | |
| 2010/0229218 A1* | 9/2010 | Kumbalimutt | G06F 9/5005 |
| | | | 726/4 |
| 2011/0041141 A1 | 2/2011 | Harm | |
| 2011/0119329 A1 | 5/2011 | Gullin | |
| 2011/0231280 A1 | 9/2011 | Farah | |
| 2012/0096153 A1 | 4/2012 | Weiser et al. | |
| 2012/0117235 A1* | 5/2012 | Castro Castro | H04L 12/14 |
| | | | 709/224 |
| 2012/0131161 A1 | 5/2012 | Ferris et al. | |
| 2014/0075025 A1* | 3/2014 | Stanforth | H04W 48/14 |
| | | | 709/225 |
| 2014/0233855 A1* | 8/2014 | Clarke | G06F 17/30247 |
| | | | 382/190 |
| 2014/0286337 A1* | 9/2014 | Dolson | H04L 43/12 |
| | | | 370/392 |
| 2014/0372956 A1 | 12/2014 | Bisca et al. | |
| 2015/0058075 A1 | 2/2015 | Tomlinson | |
| 2015/0063102 A1 | 3/2015 | Mestery et al. | |
| 2015/0372881 A1 | 12/2015 | Bellomo et al. | |
| 2015/0378993 A1 | 12/2015 | Eisler et al. | |
| 2015/0381515 A1 | 12/2015 | Mattson et al. | |
| 2016/0299637 A1 | 10/2016 | Loveless et al. | |
| 2017/0272475 A1 | 9/2017 | Yu et al. | |
| 2017/0272541 A1 | 9/2017 | Kreps et al. | |

OTHER PUBLICATIONS

"Notice of Allowance Issued in U.S. Appl. No. 15/076,195", dated May 10, 2018, 16 Pages.

"Final Office Action Issued in U.S. Appl. No. 15/076,206", dated Sep. 21, 2018, 22 Pages.

"Non Final Office Action Issued in U.S. Appl. No. 15/076,206", dated Mar. 21, 2018, 26 Pages.

* cited by examiner

First Service
*Phone-FE*

Immediate Service
*Profile Services*

Sub-Resource
*edges*

Interface 450

| Quota Type 462 | Limit 464 | Limit Type 466 | Window Duration 468 | Enforcement 470 | Charge Policy 472 | |
|---|---|---|---|---|---|---|
| Error Rate | 10,000 | Rate | 60 seconds | Track | Response | Graph |
| QPS | 20 | Rate | 60 seconds | Throttle | Receipt | Graph |
| Latency Percentile in Milliseconds | N/A | X% | 60 seconds | Track | Response | Graph |
| Edges Processed | 1,000,000 | Maximum | 60 seconds | Throttle | Response | Graph |
| Memory Usage | 100 MB | Maximum | - | Throttle | Response | Graph |
| Garbage Collection | 1 GB | Maximum | - | Track | Response | Graph |
| Cost | ### | Sum | 60 seconds | Track | Response | Graph |

Table 452

Controls 480

VISUALIZATION OF COMPUTER RESOURCE QUOTAS

RELATED APPLICATIONS

The subject matter of this application is related to the subject matter in co-pending U.S. patent application Ser. No. 15/076,195, entitled "Client Identification for Enforcing Computer Resource Quotas," and U.S. patent application Ser. No. 15/076,206, entitled "Local Enforcement of Computer Resource Quotas," both of which were filed even date herewith and are incorporated herein by reference.

BACKGROUND

This disclosure relates to the field of computer systems. More particularly, a system, apparatus, and methods are provided for setting and observing the statuses of quotas on computing resources.

Computer resources such as memory, storage, communication bandwidth, processor time, and others, are finite, even in the largest data centers and most robust computer systems. Demand exceeds capacity in many data centers and other computing environments, thereby requiring consumers of the resources to share them.

Some techniques for sharing computer resources implement quotas to ensure that individual consumers and/or collections of consumers get their share, but no more than their share. Accurate and fair application of such quotas, however, requires accurate and appropriate identification of the consumers.

For example, in a naïve application of computer resource quotas, consumption or use of a resource may be limited according to a non-specific identifier such as an IP (Internet Protocol) address or a user identifier. There may be a one-to-one correspondence between resource consumers and IP addresses or user identifiers in some environments, but in others multiple consumers may share an IP address (or other identifier), which will unfairly require the multiple consumers to share one quota instead of each receiving its own quota.

Further, in some environments, multiple entities that control access to a resource apply quotas in a collective manner. For example, each of the controller entities may report to a central entity regarding usage of the resource by clients. The central entity collects the usage statistics, and disseminates the statistics and/or quota statuses to all controller entities so that they all act in unison to deny access to clients that have exceeded their quotas. In these schemes, there is measurable delay in correctly enforcing a given requester's quota (either to deny requests when the quota is exceeded or to once again accept requests when the quota is no longer exceeded), because of the communication overhead involved in collecting and disseminating quota data. Further, based on the collective information, a given controller entity may be forced to continue to accept and process resource requests even when it is overloaded locally (i.e., because the requesters have not violated their globally applied quotas).

Also, some quota systems are configured to only enforce quotas relating to access to a resource. Such a system may set a maximum rate at which a client may submit queries to a data repository, for example. Enforcing such a quota may help prevent one client from overloading the resource with requests, but may not actually prevent the resource from being overloaded with processing. For example, a client may submit a number of queries that do not trigger the quota, but that require a great deal of processing by the resource—such as accessing a large portion of the stored data in order to satisfy the queries. Thus, a system that only restricts a rate at which a resource may be accessed may be unsuccessful in keeping the resource from being overworked.

In addition, rate-limiting quotas are generally hard-coded into the interfaces (e.g., APIs or Application Program Interfaces) through which a client (e.g., an application, a service, some other logic module) accesses a resource. This strategy makes it difficult to adjust a quota regarding the quota for a selected client. In addition, there is generally no way to view, in real-time, the status of a given quota regarding a given resource for a given client, to determine how close it is to exceeding the quota, to see whether and how often the quota was enforced, to compare a current status of the quota to a past status, etc.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for identifying clients that use or consume particular computer resources, in order to facilitate the enforcement of quotas on those resources and/or for other purposes. The quotas may be enforced locally, without reliance upon global statuses of clients' quotas. Also, a visualization interface is provided for creating, configuring, reconfiguring, and viewing statuses of quotas. The resources may include processors, communication bandwidth, storage space (e.g., memory or primary storage, disk or secondary storage, cache space), and/or other types of computing devices and resources.

In some implementations, use of a computer resource may be measured (and controlled via quotas) directly. For example, an illustrative quota may specify a maximum amount of storage space (e.g., GB, MB) that may be used or allocated, a portion of the bandwidth of a communication link (e.g., 10%, X bps, Y kbps), a measure of processor usage (e.g., cycles, time), and so on. Further, a quota may identify a maximum rate of communication or of some events, such as an error rate, an exception rate, a rate at which queries or access requests are delivered to a resource, throughput, a measure of latency, etc.

Also, or instead, use of a computer resource may be measured (and its use controlled via quotas) in terms of a cost of using the resource or work performed with the resource, such as a number of data objects accessed in a data store (e.g., database tables, nodes or edges of a graph database), a number of events accessed in a repository of system events, how much garbage collection related to a request or query was required (e.g., the cost of reclaiming memory used to process the request or query), etc.

Thus, a reference herein to a "resource," the use of which is subject to quotas for some or all consumers/clients, may refer to a traditional computing resource (e.g., processor, storage component, communication bandwidth) and/or may refer to an executable logical construct (e.g., a process, a service, a code block, an application) that uses traditional resources in the course of its execution. For example, a database may receive a query that causes it to access some portion of stored data, or some number of data objects. A quota associated with this example may be a threshold number of queries on the database per unit of time (e.g., per second), a measure of data accessed or retrieved in response to one or more queries or to all queries handled in a particular period of time (e.g., in terms of KB, MB, GB), a measure of a number of tables, rows, or other objects accessed and/or returned in response to the query (e.g., edges and/or nodes in a graph), or something else.

In some embodiments, a "client" that requests access to a controlled or restricted resource (i.e., a resource subject to quotas) is identified using a combination of names of services (or other logic constructs) that process or convey a call or request to or for the resource. For example, in a call stack identifying a sequence of program calls that cause a request for a controlled resource to be delivered to a gateway, gateway server, or other entity (e.g., a broker, a portal) that controls access to the resource, the "client" associated with the request may be identified using a tuple such as <first service, immediate service>, wherein the first service is a first service identified in the call stack, and the immediate service is one of last services (or the last service) identified in the call before the request is received at the gateway.

It should be noted that the first service is not necessarily the first or initial service that processes a given request, but rather a service that processes the request earlier in the call stack than the immediate service. Similarly, in some implementations the immediate service may not be the final service that processes a request, but rather a service that processes the request after the first service. The first service may alternatively be termed the top service.

Identities of some general services (e.g., an L1 proxy, a load balancer) may be excluded from use as first service and/or immediate service. Identifying clients requesting access to a controlled resource, for the purpose of applying quotas to the resource, is discussed below in more detail.

Also, in some embodiments, a given client's quota regarding a controlled or restricted resource is applied independently at each individual gateway (or other entity) that controls access to the resource(s). In particular, each gateway accepts or rejects a given request from a given client based on whether that client's quota for the requested resource has been exceeded or, possibly, would be exceeded locally if the request was permitted.

Each client may be awarded the same quota on each gateway, but the gateways do not pool their statistics regarding access to a controlled resource, and so each gateway makes its own independent decision whether a particular request should be accepted or rejected. For example, approval or allowance of a request for a given resource from a given client may be granted by a given gateway based (possibly solely) on the client's previous usage of the resource that was authorized by the same gateway. Therefore, in these embodiments, the client may have exceeded its quota for the resource on one gateway, but not another, and requests from the client received at two different gateways at (approximately) the same time, for the same resource, may be accepted on one and rejected on the other.

Each gateway stores clients' quotas (e.g., in a quota store or a quota limit store) and quota-related usage statistics (e.g., in a quota usage store) for determining when a given client has exceeded a quota limit. In some implementations, client quotas may be loaded onto each gateway, when it begins quota operations, from a central repository at which the quotas are set. Each gateway then monitors clients' usage of controlled resources to determine whether and when a quota is or may be violated. Depending on the type of quota (e.g., an access or query rate, a number of data objects handled, a number of memory objects that are garbage-collected) established for a given resource, an update to a quota usage store may be performed before, during, and/or after an approved request for the resource is executed or satisfied.

Further, in some embodiments, a visualization interface or user interface is provided for facilitating creation and configuration of quotas for any number of clients, for one or more controlled resources. The interface may also allow real-time observation of quota usage for one or more resources and one or more clients, to show, for example, whether a quota is exceeded, how frequently it has been exceeded, how close it is to being exceeded, and so on.

In embodiments described herein, a controlled resource is typically accessed only by clients operating within the same computing environment as the resource and the entities controlling access to the resource (e.g., the same data center or computing cluster). In particular, in these implementations the clients are internal to the environment and do not include external entities such as end users, user devices, etc.

Figure 1:
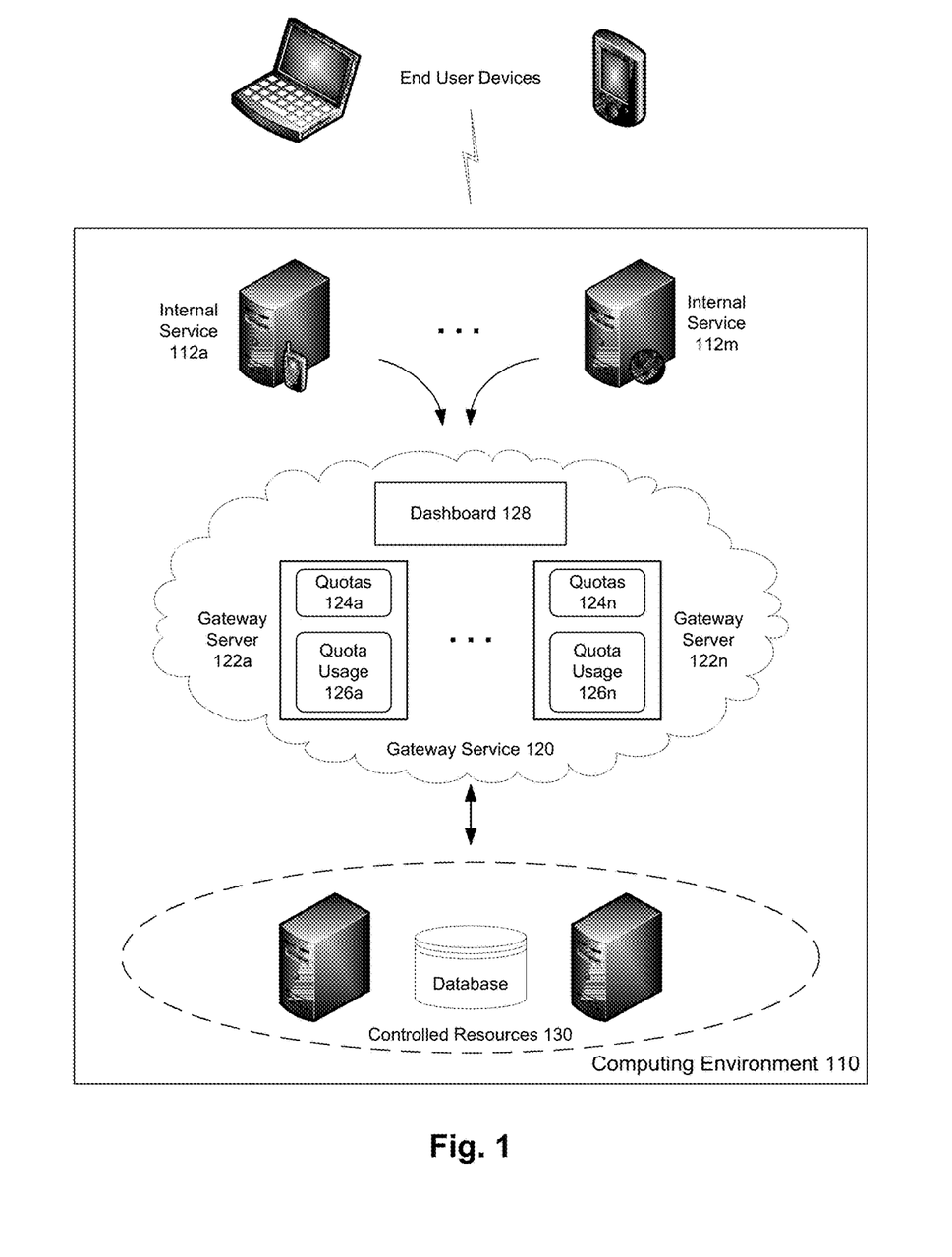
FIG. 1 is a block diagram depicting a system for identifying clients/consumers of controlled computer resources and for locally applying quotas, in accordance with some embodiments.

FIG. 1 is a block diagram depicting a system for identifying clients or consumers of controlled computer resources, and for locally applying quotas, according to some embodiments.

In these embodiments, computing environment 110 comprises various computing devices and other resources that may be configured to host a particular application or service available to external parties (e.g., end users), such as a professional network or a social network, and/or that may be configured for internal use within an organization. Therefore, in different implementations, applications, services, processes, and/or other executable logic identified herein may be accessible only within the organization that operates computing environment 110, or some of the logic may also be accessible outside the organization.

Within environment 110, controlled resources 130 comprise services, computing devices (e.g., servers, blades), communication devices, and/or other resources that can only be invoked by entities internal to computing environment 110, such as internal services 112 (e.g., services 112a-112m). Individual internal services may be invoked by other internal services, logic executing on end user devices, and/or other entities not depicted in FIG. 1.

Controlled resources 130 may illustratively include mission-critical processes that the organization desires to protect from intentional or accidental interference—such as an intentional denial-of-service attack from an external party or an accidentally generated set of requests that are so numerous or so resource-intensive as to cause failure of a controlled resource if not halted or rejected. The latter situation may result from a new internal service that issues malformed calls or that has some other bug.

Multiple instances of a controlled resource may be deployed, on separate computers or computer systems, or on one system or device. For example, a controlled database or controlled cache service may be sharded or distributed across multiple storage nodes, or a controlled computer service may be hosted by multiple computer servers (e.g., with load balancing).

A given internal service (e.g., service 112*a*) may invoke a controlled resource while performing a task for, or for the benefit of, an end user or a device operated by an end user, but those users and their devices are unable to directly invoke or access any of controlled resources 130. Thus, while an end user of computing environment 110 may engage an internal service 112 in the course of using an application hosted by the environment, requests to use a controlled resource 130 are initiated and processed only by the internal services. In addition to (non-critical) services that support the mission or goal of computing environment 110, in some implementations internal services 112 may include a proxy (e.g., an L1 proxy), a load balancer, a firewall, and/or other entities that help organize, secure, or otherwise facilitate processing within computing environment 110.

Gateway service 120 receives all calls to (e.g., requests for, invocations of) controlled resources 130. For each call to a controlled resource, a gateway server 122 (e.g., gateway servers 122*a*-122*n*) or other controller entity (e.g., a broker, a database server, a cloud session server) identifies the corresponding client, and determines whether the call should be accepted or rejected (based on the client's quota for the resource and the client's recent usage of that resource).

As indicated above, a given request may be rejected (or dropped or aborted) if the requesting client's quota for the requested resource has been exceeded or violated, or if that quota would be violated if the request was accepted. Otherwise, the request is approved, in which case the request is forwarded to the controlled resource, a response from the resource is received, and the response is forwarded to the requesting client.

Each gateway server 122 (e.g., server 122*a*) includes quotas or quota limits 124 (e.g., quotas 124*a*) for some or all clients from whom the gateway server may receive requests for controlled resources 130. A default quota for or regarding a particular resource may be stored and applied for all clients for whom custom or tailored quotas have not been configured. For each call that is not rejected, the gateway updates a quota store or quota usage store 126 (e.g., quota store 126*a*), or some other counter, measure, or other value or entity that tracks usage of controlled resources 130 in terms of quotas.

For example, if a quota is applied to limit the number of queries or requests that may be submitted to a controlled resource 130 per unit of time (e.g., one second, multiple seconds), gateway server 122*a* will update quota usage store 126*a* every time a new call is approved and sent to the resource, for or on behalf of a client that has an associated quota, and will start rejecting additional calls (or will throttle them) if and when the threshold is met during a current time period. In this example, the gateway server can determine (from its quota usage store) whether the requesting client has already met or exceeded its quota, or whether it would do so if the request was approved, and can enforce the corresponding quota immediately.

For quotas related to the amount of work performed at or on a controlled resource (or the cost of such work), such as a number of nodes or edges of a graph database that are processed or 'touched' during execution of a call, a number of hits and/or misses in a cache, a number of objects or amount of data purged from memory (e.g., during garbage collection), a number of database operations performed to satisfy a call (e.g., unions, intersections, joins, sorts), and so on, when the resource returns to the appropriate gateway server the results of the call, the controlled resource may also report the amount of work it performed. Therefore, when a new call is received that is subject to these types of quotas, the gateway server can determine whether the corresponding client has already met or exceeded its quota (i.e., based on previous calls), but may be unable to determine whether approval of the new call will cause the quota limit to be violated.

A type of work performed at or within a controlled resource (or the cost of such work), may be alternatively termed a "sub-resource" herein. For example, identifying a number of edges within a graph database resource may be termed an "edges" sub-resource, performing a database operation such as a union or intersection may be termed a "setOperation" sub-resource, and so on. Additional sub-resources are discussed further below.

In some embodiments, a REST (Representational State Transfer) architecture is implemented to support access to controlled resources 130 by internal services 112. In these embodiments, an initial, top, or first internal service issues a HTTP (Hypertext Transport Protocol) request to perform a desired operation (e.g., to read, create, update, or delete data), and the request will be conveyed to gateway service 120 directly or through one or more additional internal services, including an immediate service.

For example, if the first service directly requires a controlled resource 130, the request may be received at the gateway directly from the first service. Or, if the initial request is directed to another internal service 112 that requires access to a controlled resource in order to satisfy the request, the gateway service will receive the request (or a related request) via the other internal service.

Besides the initial or original internal service 112, any number of additional internal services may be included in a call or request chain that leads from the initial service to the gateway service (i.e., zero or more). Other operations by internal services within environment 110 can be completed without involving a controlled resource, but those operations are outside the scope of the embodiments disclosed herein.

Gateway service 120 also includes dashboard 128, which may be another computing machine (or set of machines), or a software process executing on one or more machines, to host the visualization interface mentioned above, for creating and configuring quotas, adding or modifying clients, viewing statistics (e.g., raw metrics, instances of quota enforcement, percentage of quota usage), and/or taking other action related to quotas for one or more controlled resources. Dashboard 128 may be alternatively termed a manager, a controller, a management server, etc.

Communication between individual gateway servers 122 and controlled resources 130 may also be via HTTP requests (e.g., as part of the same or a different RESTful architecture), via CORBA (Common Object Request Broker Architecture), RPC (Remote Procedure Call), SOAP (Simple Object Access Protocol), WSDL (Web Services Description Language), or some other communication scheme or framework.

Illustrative services that may be part of internal services 112, in an embodiment in which computing environment 110 hosts a professional network or a social network, include: a profile service for accessing members' profiles (e.g., to retrieve selected attributes); a visibility service for determining whether selected data or information is viewable to a given member (e.g., to determine whether one member may view a particular profile attribute of a second member based on the presence or lack of a connection between them); an inbox service for accessing communications sent to a member; a contacts service for accessing a member's contacts; a content service for accessing documents, posts, and/or other content; a mobile front-end service for interfacing with a mobile user device; a content service for populating a home page or some other page(s); a feed service for populating a feed (e.g., a news feed, an update feed); a following service to identify who is following whom; and so on.

Illustrative services that may be controlled resources in an embodiment in which computing environment 110 hosts a professional network or a social network include: a database storing a graph of members' connections (e.g., wherein nodes correspond to members and edges correspond to relationships between members); a cache service that caches data from the graph of member connections; a search service for searching the graph and/or other content within the professional or social network; and/or other services that are mission-critical and/or of high value.

A typical client identifier in computing environment 110, as indicated above, may be a tuple formed from identifiers of an early or first service and a late or immediate service in a call stack (e.g., the first and last services in the stack before the call reaches gateway service 120 or an individual gateway server). If a call is received by a gateway server 122 directly from a given service, meaning that the first service and last service in the call stack are the same, the identifier of that service alone may be used as the client identifier, or a place keeper or default service name may be used in place of the first service or the immediate service.

Further, if the first service is a general service that processes a large number or proportion of calls to controlled resources 130 (or a particular sub-resource or collection of sub-resources), such as a web server that translates an end user request into a first internal service, or a proxy for one or more general services, the name of a different service (e.g., the second service in the call stack) may be adopted as the first service for purpose of client identification. In other words, if a given client identity in the form <first service, immediate service> is determined to encompass a large proportion of calls to one or more controlled resources (e.g., 20% or more), over some historical period, in the future one or more of both of first service and immediate service may be names of other services (e.g., names of services adjacent to the first service and/or immediate service).

In some other embodiments, if a given client identity (e.g., in the form <first service, immediate service> or some other form) encompasses too much traffic or too large a percentage of calls to one or more controlled resources, the client identity may be modified in some other way to be more discriminating or more granular. For example, the name of a particular page, interface (e.g., API or Application Programming Interface), or other entity that a particular service requests may be included in the client identity, in addition to first service and immediate service, or to replace one or both of first service and immediate service.

Figure 2:
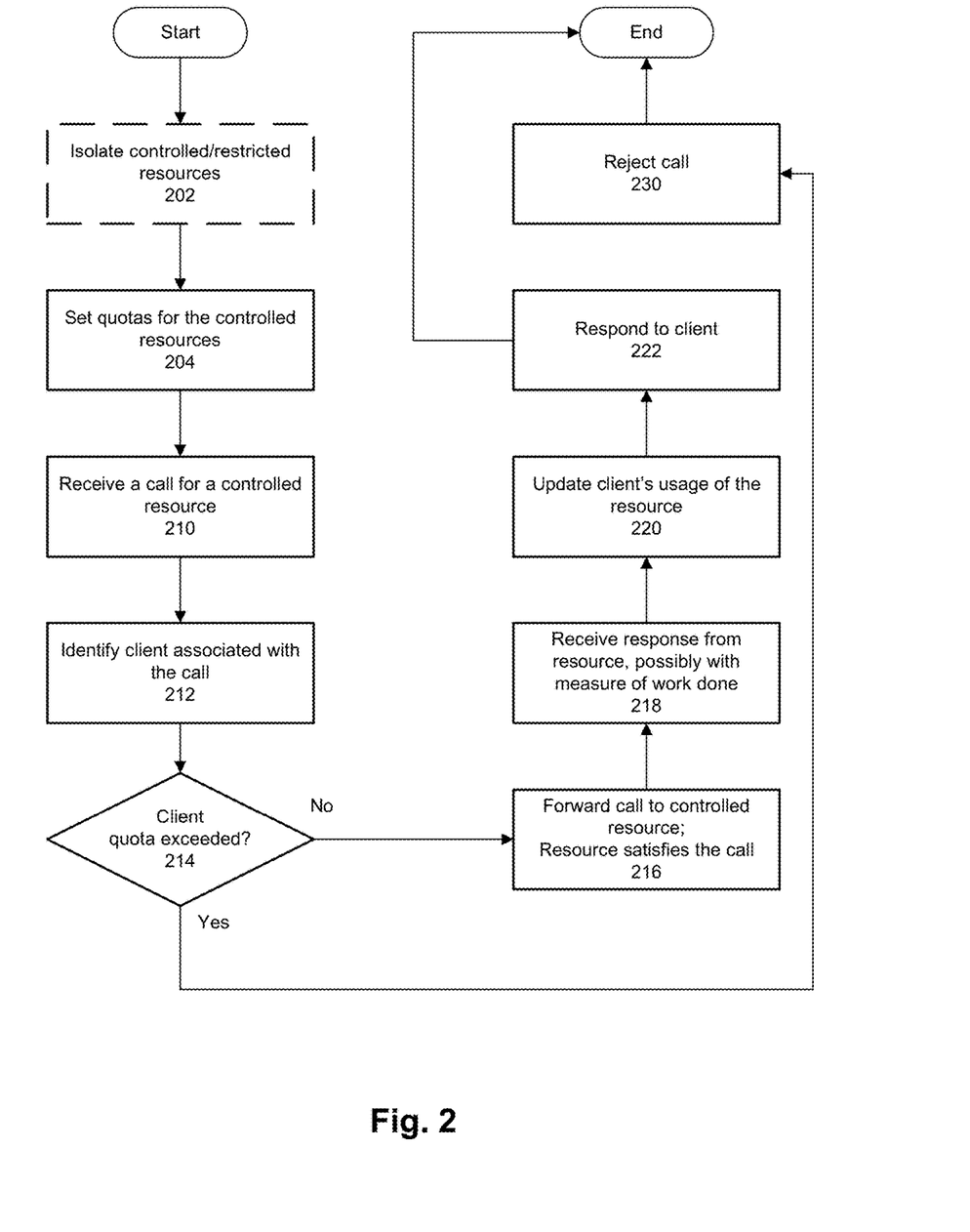
FIG. 2 is a flow chart illustrating a method of identifying clients/consumers of controlled computer resources and applying corresponding quotas, in accordance with some embodiments.

FIG. 2 is a flow chart illustrating a method of identifying clients or consumers of controlled computer resources and applying corresponding quotas, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In optional operation 202, one or more resources within a computing system or environment are identified, and isolated if necessary. In some embodiments, isolating the resources may involve separating them from clients and consumers by permitting access only through a broker process, a gateway server, or some other hardware and/or software that prevents unauthorized access to the resource(s), and/or that can apply quotas to the clients' access to the resource(s).

For example, as discussed above regarding environment 110 of FIG. 1, controlled resources 130 can generally only be invoked or accessed by a gateway server 122 within gateway service 120. Requests for the controlled resources issued by other entities, such as internal servers or services 112, are delivered to the gateway service instead of the individual resources.

In operation 204, quotas are established for the controlled resource(s). Establishment of quotas may be an ongoing process, meaning that new quotas may be set for new clients as the system implementing the quotas learns of them, quotas for known clients may be increased or decreased depending on client traffic, and a quota may be removed or deleted if a client is retired or otherwise becomes inactive. Similarly, quotas may also be added or modified when a new controlled resource is added to the quota framework or an existing resource is reconfigured.

In some embodiments, appropriate initial quotas for different clients may be determined by observing some or all clients' requested access to the resources over some period of time. These observations may allow identification of a given client's level of access—a minimum and/or maximum level of access, a 'normal' (e.g., average) level of access, etc. The observations may also, or instead, enable determinations as to how one client's access to the controlled resource(s) compares to other clients' access. Thus, clients may be ordered or ranked according to the amount, frequency, or level of access that they need or that they exhibit during the period of observation. Quotas for each of one or more controlled resources may then be configured or apportioned appropriately.

In some other embodiments, a default quota is established for each controlled resource, which may be based on a pattern of access to (or use of) the resource by an average or model client. The default quota may be applied to some or all clients of the resource, but one or more selected clients may be assigned custom or tailored quotas to allow lower or higher levels of access to (or use of) the resource. Illustratively, although a central repository acts as a source of truth for multiple clients' quotas, which are distributed to the gateways, if a gateway receives a request for a controlled resource from a (new) client for which no quota has been set, the gateway may apply the default quota until the central repository issues a quota for the client.

Figure 4A:
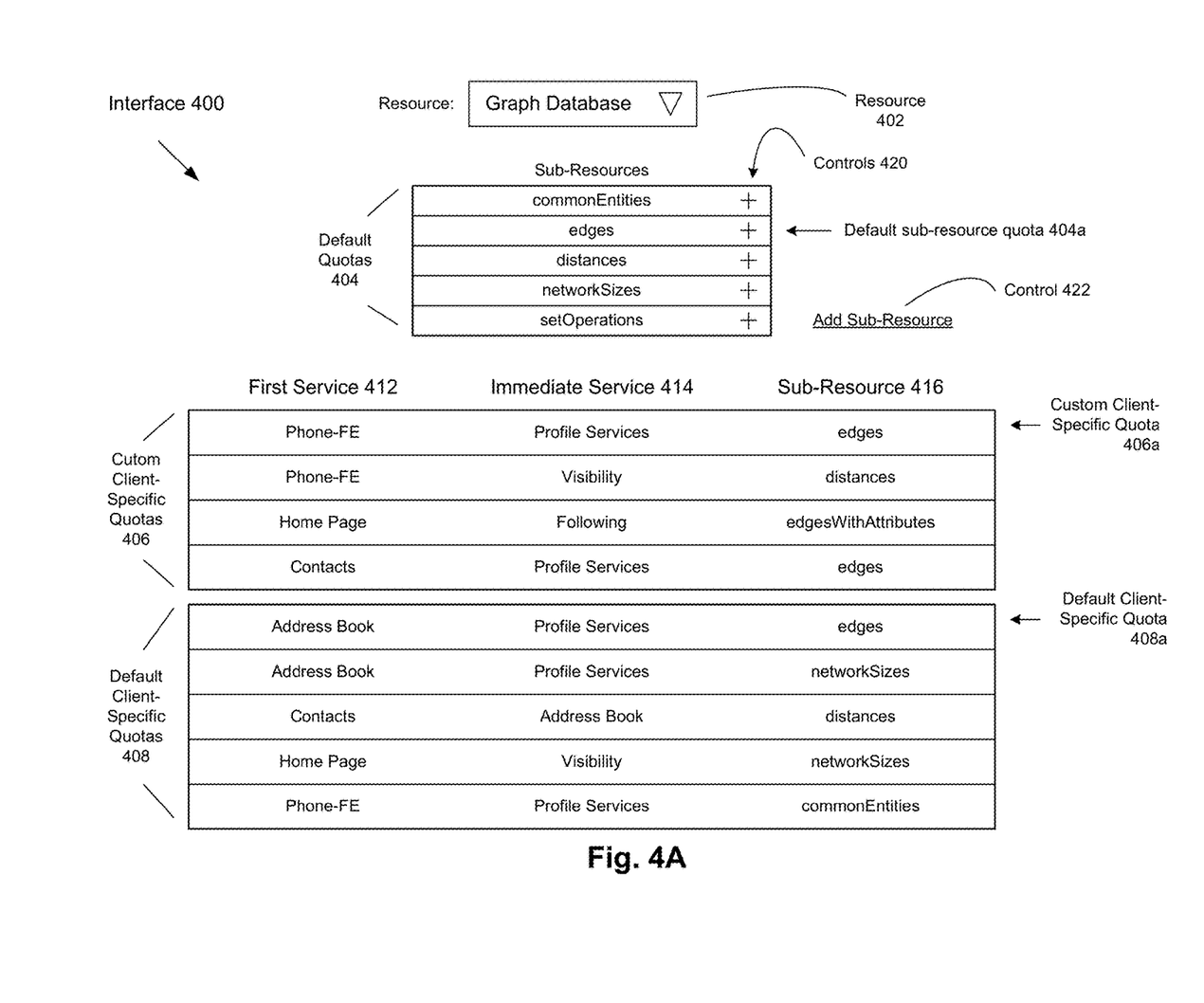
FIGS. 4A-4C depict an interface for a system or apparatus for applying quotas, in accordance with some embodiments.

Quotas may be set (or modified) using a tool such as the interface discussed below in conjunction with FIG. 4.

In operation 210, a call (or request) is received for a controlled resource, at a gateway, broker, or other entity that manages access to the resource. For example, the request may be received at one of multiple gateway servers that enforce quotas for the resource. Illustratively, resource requests may be distributed among the servers by a load-balancer or according to some queuing or distribution strategy.

In operation 212, the client associated with the call is identified. In the illustrated method, the client is identified with a tuple comprising the first service identified in the system call (e.g., the originator of the call) and the immediate (or last) service that processed the call before its receipt at the gateway, which may be represented as <first service, immediate service>.

As discussed above, in some implementations or environments, the first service may be a user-facing or front-end service that receives a request from an end user or a device operated by an end user, or another service called by such a service. In other implementations, the first service is simply the first service identified in the call stack, but some types of services that may be the first identified service (e.g., an L1 proxy, a load balancing service or process, a general service that handles a large portion of traffic) may be ignored and the next service may be adopted as the "first service."

In the illustrated method, in order to set and maintain fair and sufficient quotas, it is helpful to accurately associate calls for controlled resources with the clients that caused the calls, based on the sequences of services that deliver the calls. This may help avoid defining or identifying individual clients too coarsely (e.g., to include too many clients) or too finely (e.g., to include too few clients).

If a client is identified or defined too coarsely, it may be recognized as the source of a relatively large number of resource requests, and a quota assigned to the client may be too small to accommodate normal, acceptable usage by the client. Then, if the quota must be enforced (e.g., by throttling or rejecting calls associated with the client), a large number of calls may be dropped, which may affect a large number of end users and/or internal services.

Conversely, if a client is identified or defined too finely, it may be recognized as the source of relatively few resource requests, and a quota assigned to the client may be larger than is needed to accommodate the client's normal usage. In this case, the quota may never be enforced, and/or the resource may be under-utilized because too much of its use was reserved for this client. Also, defining clients too finely yields a relatively large number of clients, and significant processing will be required simply to set, maintain, and enforce their corresponding quotas, which may degrade the overall system or environment.

Thus, in the illustrated method, identifying a given client as a combination of the first service and the immediate service in call stacks associated with the client's resource requests may provide a good balance between coarse and fine identification.

In operation 214, the gateway server that received the call or request determines whether the corresponding client's quota for the requested resource has already been consumed, within an applicable period of time if appropriate. If the quota has not yet been met or exceeded, the request is allowed and the method continues at operation 216; otherwise, the method advances to operation 230.

In operation 216, the call is forwarded to the controlled resource, which performs the desired processing to retrieve data, modify data, store data, or take some other requested action.

In operation 218, the controlled resource responds to the call by returning requested data, by acknowledging completion of the desired processing, or by responding in some other manner. Also, however, the resource may return a measure of the amount of work done by the resource for the call, or the cost of such work. The resource may be configured to return this information for specific types of calls or requests, for specific clients, and/or whenever the gateway requests it.

In operation 220, the gateway updates a measure of usage of the controlled resource by the client (e.g., a quota store), based on work and/or costs reported by the resource and/or determined by the gateway. If the usage exceeds the client's quota, and still exceeds the quota when a subsequent request for the same resource is received from the client, the subsequent request may be rejected.

In general, this operation may be performed whenever the necessary information is available. As described above, for example, some quotas simply limit a rate of access to a controlled resource, and the corresponding quota store may be updated any time after a new request is received and approved (e.g., before the request is forwarded to the resource).

In some embodiments, it may be desirable to first determine whether a new call or access request would cause the corresponding client to exceed its quota, for quotas such as rate limits that can be measured by the gateway. For other types of quotas this may be more difficult or may not be feasible, such as quotas that limit the amount of work that a controlled resource may expend for a client (e.g., for a given request, during a given period of time), in which case the gateway will update its quota store after every permitted access and may then reject a subsequent request from the same client if its quota is exceeded at that time.

It may be noted that if a client exceeds its quota during the processing of a current call, the processing may be terminated or may be permitted to complete, but the fact that the quota has been exceeded will be realized when a subsequent call associated with the client is received for the same resource (during a current time period, if applicable), and that other call may be dropped or rejected.

In operation 222, the gateway server that handled the call (or some other gateway server) receives the response from the controlled resource and responds to the requesting client. This may involve returning a response to the call (e.g., with requested data) that may traverse the same call stack as the request, but in reverse order.

In operation 230, the call for the controlled resource is rejected or dropped because the client has exceeded its quota for the requested access to the controlled resource, or would exceed its quota if the call were accepted. The client or some other originator of the call may re-issue the call according to its retry protocol.

After operation 222 or operation 230, the illustrated method ends or returns to an earlier operation to handle another call or request for a controlled resource.

In some embodiments, some or all quotas enforced by entities that control access to a resource (e.g., gateway service 120 of FIG. 1) have corresponding time periods. For example, an illustrative quota may restrict the amount of work that a controlled resource can be required to perform, or the 'costs' it may incur, during a time period (e.g., one second, multiple seconds, one minute, multiple minutes or longer time periods) on behalf of a corresponding client. Quota stores maintained at the controller entities will track usage during the time periods, as already discussed.

Figure 3:
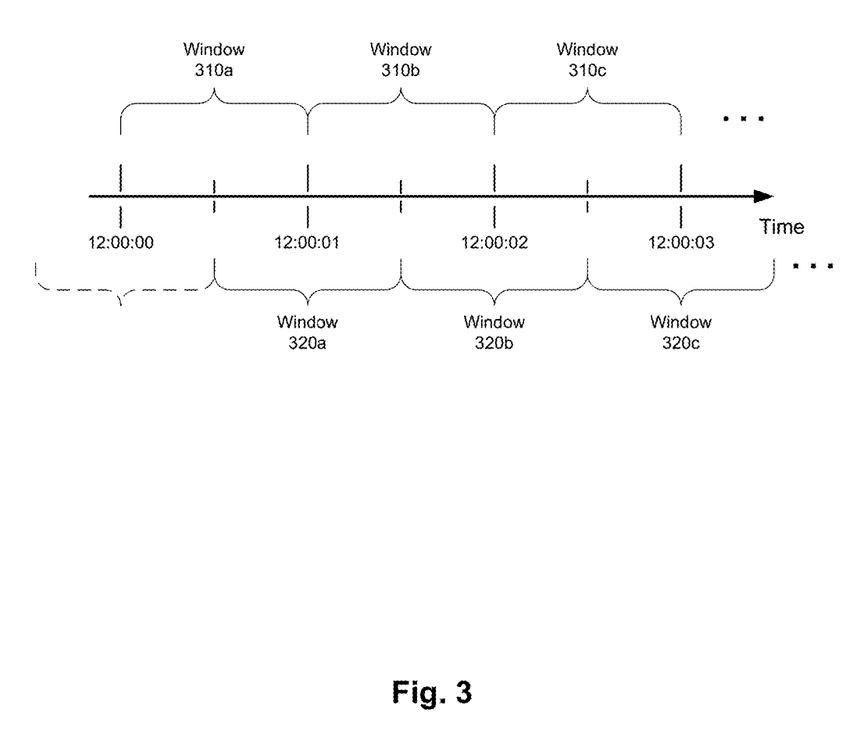
FIG. 3 depicts concurrently running time periods associated with quota enforcement, in accordance with some embodiments.

In some implementations, however, multiple time periods may run concurrently. FIG. 3, for example, depicts concurrently running time periods associated with quota enforcement at a gateway server, according to some embodiments.

In FIG. 3, at least one quota associated with a controlled resource is enforced during continuously repeating time periods of fixed duration—one second in this example. Over time, a first sequence or set of quota windows (i.e., windows 310) is aligned with one-second periods from 12:00:00 to 12:00:01, from 12:00:01 to 12:00:02, and so on. A second sequence or set of quota windows (i.e., windows 320) is offset from the first sequence by half of the fixed-time duration.

As a result, a quota window of either sequence will overlap with each of two consecutive windows of the other sequence. For example, window 320a overlaps windows 310a, 310b, while window 310c overlaps windows 320b, 320c. The boundaries of a given window in either sequence thus coincide with midpoints of consecutive windows in the other sequence.

When one window closes in a sequence and a new one opens, a corresponding quota store (or a corresponding portion of a quota store) is flushed or reinitialized. As discussed above, during the new window, the quota store will be updated to record access to (or use of) the corresponding controlled resource by the corresponding client during the time period associated with or demarked by the window. Because of the overlapping window sequences, each quota store update associated with approval or satisfaction of a resource request will cause two quota usage stores (or two quota usage store portions) to be updated, one of which (i.e., the one that has existed for a longer period of time) will be a superset of the other. As a result, at all times at least one window will have sufficient samples to compute meaningful statistics.

When the status of the usage of a quota is needed at a particular moment in time (e.g., to determine whether the quota has been exceeded), quota usage stores or quota usage store portions associated with either or both of the windows that encompass the moment may be examined. In some implementations, however, only the quota usage store or quota usage store portion associated with the window that has been open for the longest amount of time is examined.

In other words, although a corresponding quota usage store may be updated throughout the entire time period associated with a given window, that quota usage store may be used to enforce the associated quota only during the second half of the window. During the first half, the overlapping window of the other sequence of windows will be older and therefore its corresponding quota usage store will be used to enforce the quota or to indicate the quota's status (e.g., whether or not it has been exceeded).

Figure 4B:
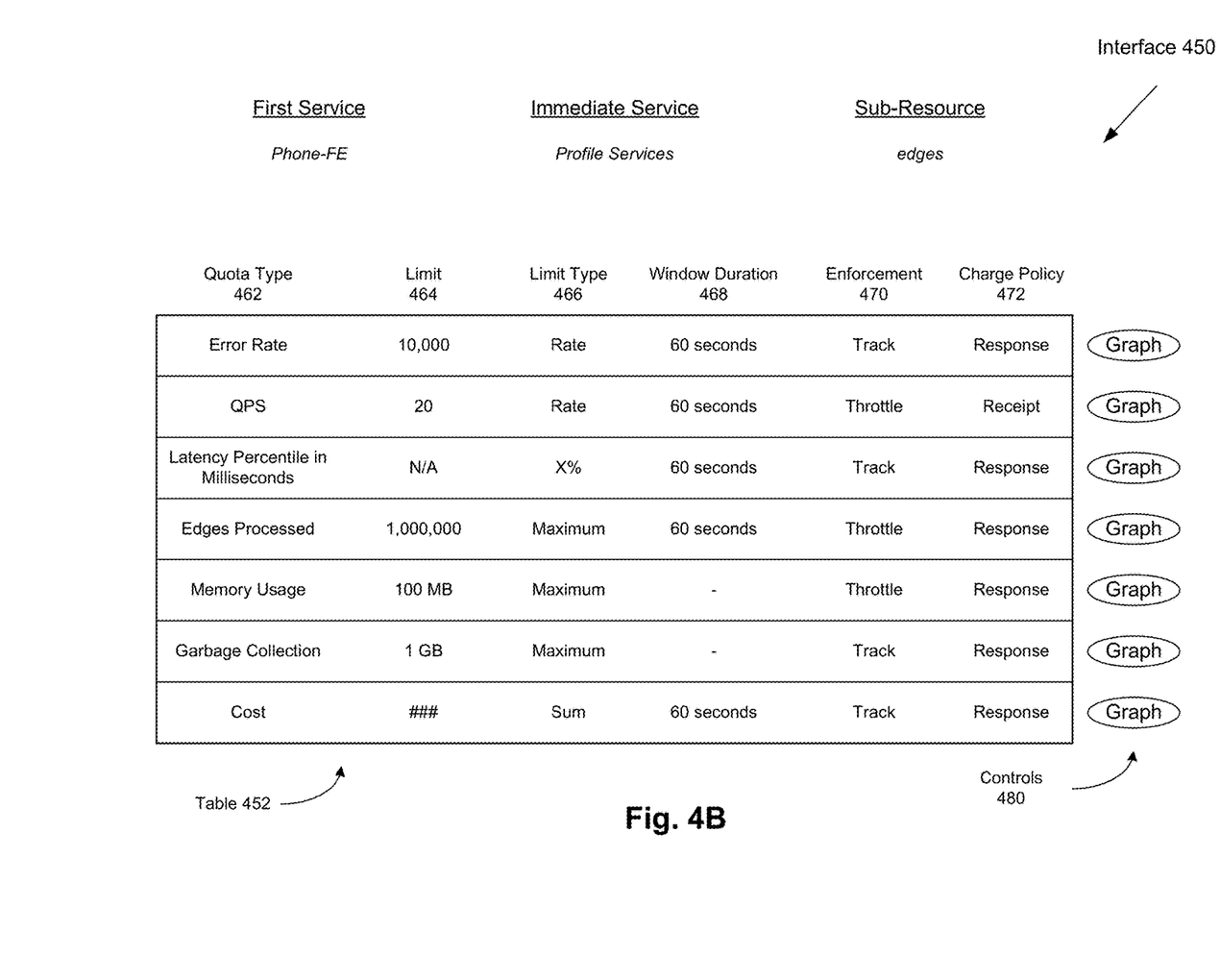
Figure 4C:
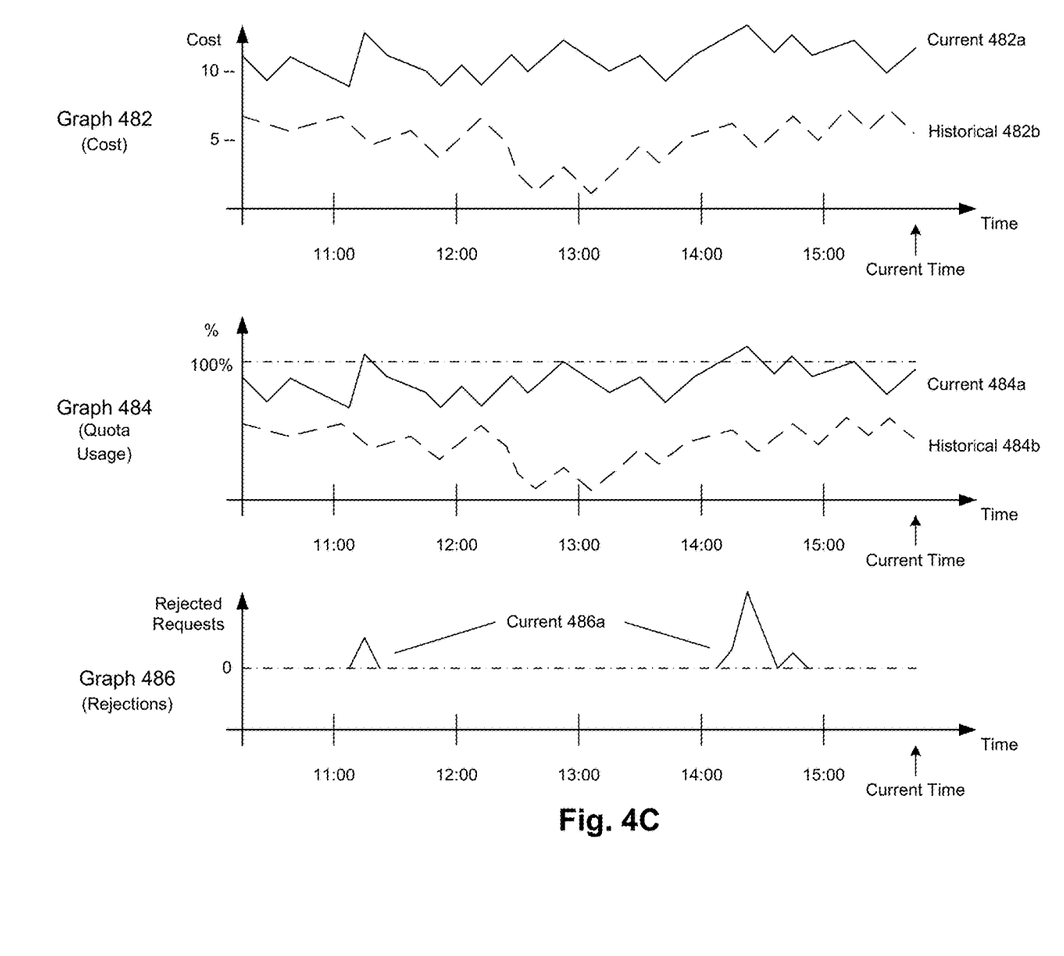

FIGS. 4A-4C depict a visualization interface for a system or apparatus for enforcing quotas, according to some embodiments. In these embodiments, the visualization interface and the corresponding quota system are for a professional network or a social network.

An operator, administrator, or other person may use the interface to create quotas, configure and/or reconfigure quotas, verify or observe enforcement and/or statuses of the quotas, and/or take other action regarding quotas for one or more controlled resources. The visualization interface may also be used, in some implementations, to observe the statuses of gateway servers and the controlled resources (or the computing devices hosting the resources).

In FIG. 4A, interface 400 presents (portions of) multiple tables, including default quotas 404, custom client-specific quotas 406, and default client-specific quotas 408. Default quotas 404 include entries for each sub-resource that has been defined for resource 402, which may be selected from a drop-down menu or in some other way.

By way of illustration, a "commonEntities" sub-resource of the graph database resource 402 may identify entities (e.g., nodes, members) that are common to two portions of the database (e.g., personal networks of two members of the professional network), an "edges" sub-resource may involve identifying a number of edges within a portion of the database, an "edgesWithAttributes" sub-resource may involve identifying edges and corresponding attributes (e.g., describing a connection between two members), a "distances" sub-resource may identify a distance or number of hops between two entities (e.g., two members' corresponding nodes), a "networkSizes" sub-resource may identify the number of first-degree connections (or connections of some other order) of a member of the professional network, a "setOperations" sub-resource may involve one or more set operations (e.g., union, intersection) within the database, and so on. The scope of embodiments discussed herein is not dependent upon the types of resources and/or sub-resources for which quotas are implemented, nor the (types of) quotas that are enforced.

Default client-specific quotas 408 are derived from default quotas 404 and therefore include entries that pair specific clients with specific sub-resources (from table 404). The clients are identified using identities (e.g., names) of services (e.g., first services and immediate services) that may process requests for the sub-resources, as discussed above. In some embodiments, when a sub-resource is created or defined, and a default quota associated with it, such as default sub-resource quota 404a, an entry is added to table 404. Then, when the default sub-resource quota for a given sub-resource is associated with a specific client, in order to restrict that client's use of the sub-resource, a corresponding quota is derived and added to table 408, such as default quota 408a. Thus, a default client-specific quota 408 for a particular sub-resource (e.g., "edges") matches the corresponding default quota 404 for that sub-resource in terms of how it limits a client (e.g., a maximum number of queries per second), but will be tied to a specific client.

Custom client-specific quotas 406 include entries for pairings of specific clients and custom or tailored quotas for specific sub-resources. Illustratively, when the default quota for a particular sub-resource is not suitable or appropriate for a given client, a custom version of the quota is created for the client, such as custom quota 406a, and a corresponding entry is made in table 406. Or, a default client-specific quota 408 may be modified to differ from its default configuration, at which time it may be added to the table of custom-specific quotas 406. For example, quota 406a applies to a specific client identified as <Phone-FE, Profile Services>, for the sub-resource "edges," and will differ from default quota 404a for "edges" (e.g., in terms of the maximum number of queries per second that is permitted).

An operator viewing interface 400 may click on an entry in any of tables 404, 406, 408 in order to view and/or modify the associated quota, as shown in FIG. 4B. Interface 400 may also include one or more controls (e.g., buttons, links) for taking certain action, such as a control for creating a new resource (not shown in FIG. 4A), controls 420 for creating a new default client-specific quota from a default sub-resource quota, control 422 for creating a new default sub-resource quota, etc. Also, one or more of tables 404, 406, 408 may be presented on separate pages in other implementations.

In some embodiments, a new default client-specific quota may be created automatically. In these embodiments, when a gateway server receives a request for a controlled resource (and sub-resource), but the client is not already known or is not recognized (i.e., there is no entry for the client/resource combination in either table 406 or table 408), a new entry is created in table 406 for the client/resource combination, with a configuration copied from the entry in table 404 that matches the requested sub-resource.

In FIG. 4B, interface 450 displays quota 406a selected from table 406 of interface 400. In addition to showing the client (<Phone-FE, Profile Services>) and sub-resource (edges) that identify the quota, table 452 lists the details of the quota, and shows that a given quota may include multiple different types of controls or restrictions, any or all of which may be enforced at a given time.

In particular, for the quota illustrated in FIG. 4B, table 452 includes seven entries, each of which defines a different restriction or type of restriction. These restrictions or controls may alternatively be termed sub-quotas, aspects or parameters of the quota, and any or all of them may be active/enforced active/enforce (or inactive/not enforced) at a given time.

Quota type 462 identifies the type of each quota restriction. Illustrative types include error rate (a rate at which the resource/sub-resource reports errors; exception rate (a rate at which the resource/sub-resource reports exceptions); QPS or queries (or requests) per second; latency—which may be measured as an accumulation over time, as a percentile, or in some other way; as a number of edges processed within the resource; memory usage; garbage collection required or performed due to a client's activity; a total cost incurred by a request; and so on.

Limit 464 and limit type 466, together, indicate the limit on the restriction and how that limit is measured, and window duration 468 identifies a relevant time period. For example, the 'error rate' entry indicates that the quota applies when more than 10,000 errors are generated within the period of time indicated by the window duration. The 'QPS' entry indicates that the quota restricts the client to 20 QPS (per second) during the window of time (i.e., 20×60=1, 200 during a 60 second interval).

The 'latency percentile in milliseconds' entry indicates that the client's request(s) for the sub-resource will violate the quota restriction if they experience latency greater than the $X^{th}$ percentile (X %) (e.g., a standard percentile such as 50%, 95%, 99%) over the period of time indicated by window duration 468 (e.g., 60 seconds). In other words, whatever value the $X^{th}$ percentile corresponds to within a distribution of response times for client requests for the sub-resource (e.g., 15 ms, 50 ms) during some historical time period, this quota type will be violated when the latency experienced by requests exceeds that value.

The 'edges processed' entry indicates that a maximum of 1 million edges may be touched while satisfying the client's request(s) (during a time period, if applicable). The 'memory usage' entry indicates that the client may use or be allocated up to 100 MB of memory at a time. The 'garbage collection' entry indicates that the client may use up to 1 GB of garbage-collectable memory (e.g., heap) at a time. The 'cost' entry usually has some numerical value for limit 464, which depends on how the cost is calculated, and indicates that a sum of the cost(s) of the client's requests for the specific sub-resource cannot exceed the limit 464. In different implementations, the cost of using or requesting a sub-resource may be calculated as an amount of processor time used by the client, an amount of memory dedicated to the client's request (e.g., which may overlap with a 'memory usage' quota type), an amount of input/output performed to satisfy the client's request(s) (e.g., in terms of bandwidth, throughput, number of I/O operations), etc.

Window duration 468 identifies the length of time for which the restriction accumulates before being purged. If the client's behavior causes limit 464 to be exceeded (or, possibly, matched) during one window, the quota will be enforced as indicated by enforcement 470. Some quota types may not have associated time durations. As shown in table 452, for example, a memory usage and/or a garbage collection quota type may be configured as maximum values. Similarly, a cost quota type may be expressed as an instantaneous maximum. Alternatively, however, these types of quotas may be configured as sums—such as a limit on the total amount of memory that may be used by or allocated to the client's requests, or the total amount of garbage collection that may be necessitated by the client, during a time period.

Enforcement 470 identifies whether and/or how the quota restriction is enforced. One enforcement policy or possibility is 'Throttle,' meaning that further requests from the client after the limit is exceeded, during the same window 468 (if applicable), will be rejected. Another possibility is 'Track,' meaning that violation of the corresponding quota restriction is tracked or recorded, but is not actually enforced (meaning that violating the limit will not cause subsequent requests to be rejected).

Charge policy 472 identifies when the client is charged for use of the sub-resource. Illustratively, the client may be charged (against one or more quota restrictions) every time a request is received for the resource/sub-resource (e.g., "Receipt"), or when a response to a request is served or returned toward the client (e.g., "Response").

To modify a setting for a field of an entry in table 452, an operator may select the entry (e.g., by clicking on it), at which time the value of the field may be displayed within a text window that allows the operator to type a new value, a drop-down menu that lets the operator select from preconfigured options, or the value may be modified in some other manner.

An operator using the visualization interface may activate a control, such as one of controls 480, in order to access a graph or other display of the quota (or a specific quota type) and/or its enforcement. One or more other controls (not shown in FIG. 4B) may be activated to add an entry to table 452, to delete an entry, to access an audit log showing changes to the displayed quota, or to take some other action.

FIG. 4C displays three graphs, although in other implementations any number may be presented (i.e., 1 or more), and controls and/or menus may be provided for selecting which graphs to present. Where appropriate, the graphs correspond to the quota or sub-quota associated with the control 480 that was selected, as well as the corresponding client, resource, and/or sub-resource.

Graph 482 reflects total costs incurred by the selected resource (e.g., graph database) and/or sub-resource (e.g., edges), in terms of absolute metric values. The indicated 'cost' depends on the selected quota and/or sub-quota, and may be, for example, a number of edges (or other objects) processed or returned, a number of queries or requests processed, a measure of resource usage (e.g., processor, I/O) and so on. Example graph 482 illustratively reflects queries per second received for a particular resource/sub-resource, and the indicated cost indices of '5' and '10' reflect 5 QPS and 10 QPS, respectively.

In graph 482, current plot 482a reflects current costs (QPS) for a recent period of time (e.g. approximately 10 am through 4 pm). Historical plot 482b shows the costs incurred during some past period of time (e.g., one hour ago, one day ago, two weeks ago, a month ago, a year ago), for comparison.

Graph 484 reflects usage of the selected quota, for the resource/sub-resource, by the corresponding client and/or by all clients. Full usage of the assigned quota (e.g., the maximum permitted number of queries per second) is indicated by the line representing 100%. Current usage is plotted as current curve 484a, while usage during the selected historical period is plotted as historical curve 484b.

Graph 486 shows when requests for the resource/sub-resource were rejected, and the amount or magnitude of requests that were rejected. In this example, nothing is plotted for intervals of time during the selected historical period when no requests are rejected. Therefore, current curve 486a is discontinuous.

The portion(s) of the visualization interface depicted in FIG. 4C may also include various controls for setting the date(s) or length of the historical period (or eliminating historical plots), showing statistics from only one machine (e.g., one gateway), showing aggregated statistics from multiple (or all) machines, showing statistics from multiple data centers (or only selected data centers), changing the format of the graphs (e.g., to display histograms), zooming into or out of a portion of a graph, displaying more (or less) verbose legends, changing scales, selecting a different resource/sub-resource, selecting a different client or clients, selecting a different quota or sub-quota, and/or making other adjustments.

The visualization interface of FIGS. 4A-4C may be deemed multidimensional, in that it offers a first page or portion that identifies resources and sub-resources for which quotas have been configured (default and/or custom), a second page or portion that displays the specific configuration (and that allows modification) of a selected quota, and a third page or portion that displays one or more graphs depicting statuses of one or more quotas, sub-quotas, resources, sub-resources, computing devices, and/or other entities.

Figure 5:
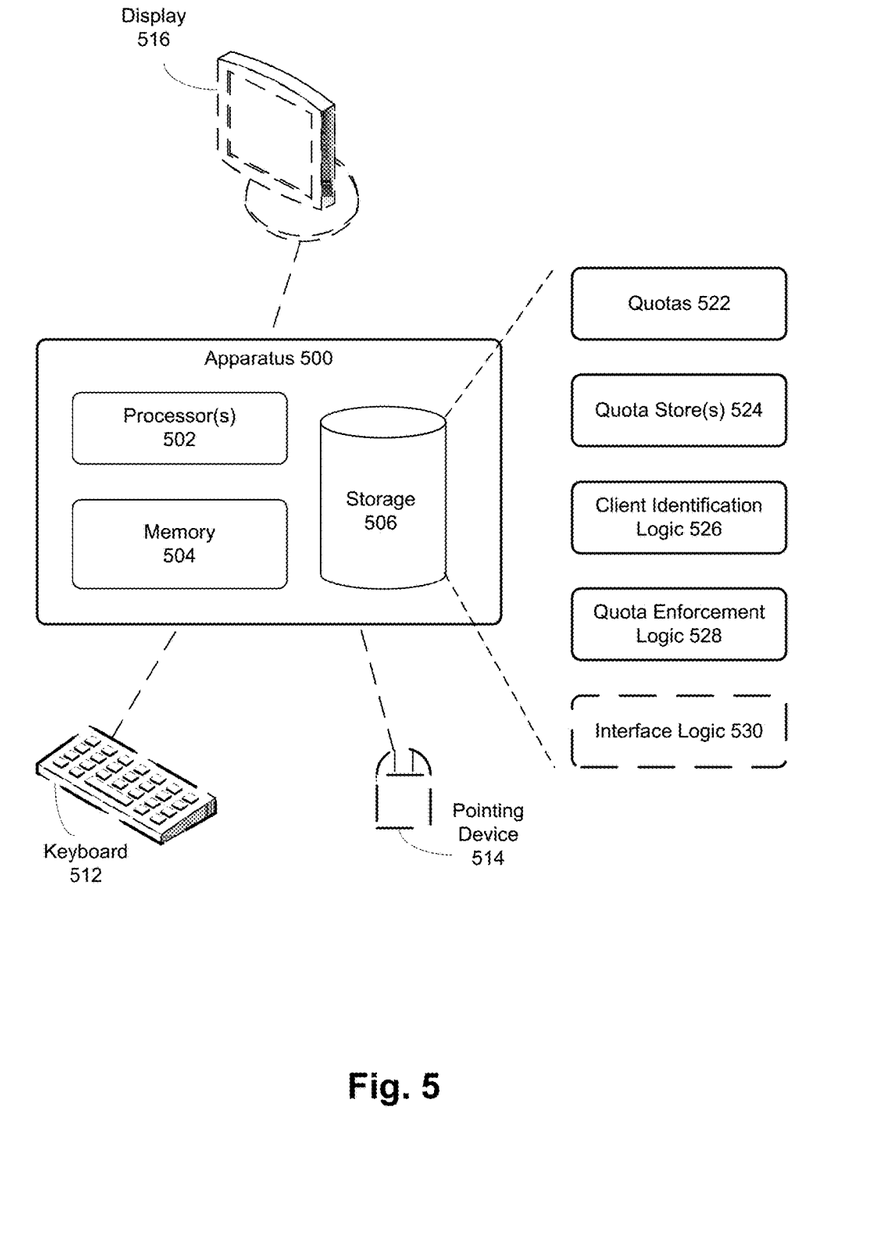
FIG. 5 depicts an apparatus for applying quotas regarding controlled computer resources, in accordance with some embodiments.

FIG. 5 depicts an apparatus for applying quotas regarding controlled computer resources, according to some embodiments.

Apparatus 500 of FIG. 5 includes processor(s) 502, memory 504, and storage 506, which may comprise any number of solid-state, magnetic, optical, and/or other types of storage components or devices. Storage 506 may be local to or remote from the apparatus. Apparatus 500 can be coupled (permanently or temporarily) to keyboard 512, pointing device 514, and display 516.

Computing resources for which apparatus 500 identifies clients or consumers, and for which the apparatus controls access, may include resources depicted in FIG. 5 and/or other resources. For example, apparatus 500 may act as a gateway or broker for accessing restricted resources that are remote from the apparatus. In an illustrative computing environment, one or more remote computing devices (e.g., servers, blades, computing clusters) include controlled resources (e.g., processors, memory, secondary storage) and/or host controlled resources (e.g., a search engine, a caching system or apparatus, shards of a database, mission-critical processes, other restricted services) and possibly sub-resources. References to resources will be understood to also encompass sub-resources.

In the illustrated embodiments, storage 506 stores quotas 522 and quota store(s) 524. Quotas 522 include quotas for any number of clients for any or all restricted resources. Each quota identifies the maximum amount or maximum measure of the corresponding resource that the corresponding client can use, during a given period of time where appropriate, and each of multiple apparatuses 500 may apply the same quota for the same client/resource combination. In other words, when a quota is assigned to a client (for a given resource), that quota may be enforced by all apparatuses that control access to the resource. The quotas may be set by apparatus 500, by some other apparatus, or by another entity (e.g., a dashboard/controller server or process operating as part of gateway service 120 of FIG. 1).

Quota store(s) 524 track the clients' usage of controlled resources to allow apparatus 500 to determine whether and when a client has violated (e.g., reached or exceeded) a quota. Each time a client request for a resource is accepted or approved, a corresponding quota store 524 (or a portion of a quota store corresponding to the client/resource pair) is updated accordingly, to reflect usage of the resource (or the cost of executing the request).

Illustrative quotas for a given client/resource combination (during a window of time, if applicable) include: a maximum amount of memory that may be allocated to or used by the client (e.g., to process calls for the resource); a maximum number of queries the client may direct to the resource; a maximum number of combined or concurrent requests the client may submit; a maximum number of graph edges, nodes, or other objects (e.g., within a graph database) that may be 'touched' or retrieved on behalf of the client; a maximum rate of events (e.g., errors, exceptions) that may be caused or generated by the client's requests for the resource; a maximum amount of garbage collection the client may cause; a maximum amount of latency that may be observed (e.g., regarding responses to the client's requests); a maximum number of cache hits (or misses) the client may cause.

In general, a quota can be defined to reflect a maximum for any type of 'cost' the resource or some other entity or entities (e.g., a gateway service, an individual gateway server) may incur on behalf of the client. Calculating the cost of a quota may therefore entail a weighted summing of underlying operations in support of the client's requests, wherein each type of operation by the controlled resource and/or gateway could be weighted differently. After a particular quota for a resource is reached or exceeded, calls or requests from the client that would require additional resource use or cost may be rejected.

Storage 506 also stores logic and/or logic modules that may be loaded into memory 504 for execution by processor(s) 502, including client identification logic 526, quota enforcement logic 528, and optional interface logic 530. In other embodiments, any or all of these logic modules may be aggregated or divided to combine or separate functionality as desired or as appropriate. Also, or instead, some of the logic, such as interface logic 530, may be executed on some other device that cooperates with apparatus 500.

Client identification logic 526 comprises processor-executable instructions for identifying clients associated with system calls, requests, and/or other communications received at apparatus 500 that solicit or require access to one or more controlled resources. As indicated above, in some embodiments, an identity of a client associated with a given call or request comprises a combination of identifiers of two or more services, processes, or other logic modules that originated, processed, and/or conveyed the call or request to apparatus 500. In an illustrative implementation, identifiers of two services are employed—that of the front-end service or user-facing service that originated the request (or an initial service in the call stack), and of the final or immediate service that delivered the call or request to apparatus 500.

Quota enforcement logic 528 comprises processor-executable instructions for enforcing quotas on controlled resources. Thus, logic 528 may be executed to set or revise a given quota 522, and may update quota store(s) 524 as clients access or otherwise use the controlled resources, may purge data in a quota store as required (e.g., as windows of time for accumulating usage statistics are reset).

Optional interface logic 530 comprises processor-executable instructions for presenting a visualization interface that allows operators to create, configure, and reconfigure quotas, access statistics regarding clients' use of the resources and how often or how close they come to violating their associated quotas, statuses of apparatus 500 and/or other apparatuses that control access to resources, and/or provide other features.

In some embodiments, apparatus 500 includes other logic, such as resource communication logic for interacting with controlled resources (e.g., to deliver or execute approved calls and requests), gateway logic for receiving calls for controlled resources, logic for adding (or removing or revising) controlled resources, etc. Some or all of this other logic may be combined and/or merged with logic modules 526, 528, and/or 530.

Yet further, storage 506, memory 504, and/or some other component(s) of apparatus 500 store an operating system executed by processor(s) 502 to coordinate the use of hardware and software resources of the apparatus. For example, to perform tasks described above, logic stored in storage 506 and/or other program code executed by processor(s) 502 may obtain the use of resources of apparatus 500 from the operating system, and may interact with a user of the apparatus through a hardware and/or software framework provided by the operating system.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:
    identifying a computing resource having one or more associated quotas;
    identifying multiple clients that request access to the resource, wherein each client is identified with a combination of:
        a name of a first service that processes a request for the resource; and
        a name of another service that processes the request prior to delivery of the request to a gateway service that controls access to the resource;
    causing a computer system to display a visualization interface comprising:
        a first portion listing the one or more quotas associated with the resource, wherein the first portion comprises a first set of default quotas for a first set of the identified clients; and
        a second portion displaying a configuration of a quota selected in the first portion; and
    upon selection and reconfiguration by a user of a default quota for a first client, adding to the first portion of the visualization interface a first custom quota for the first client.

2. The method of claim 1, wherein the first portion further comprises:
    a default set of quotas for different sub-resources of the resource; and
    a second set of custom quotas for a second set of the identified clients.

3. The method of claim 1, wherein the second portion displays one or more sub-quotas of the selected quota and, for each sub-quota:
    a type of the sub-quota;
    a limit of the sub-quota; and
    a duration of a time window during which a client's use of the resource is aggregated for comparison with the limit.

4. The method of claim 3, wherein the type of each of the one or more sub-quotas is one of:
    error rate;
    exception rate;
    memory usage;
    latency; and
    garbage collection.

5. The method of claim 1, wherein:
    one or more of the first portion and the second portion comprise a link to a third portion; and
    the third portion comprises a graph depicting statuses of one or more selected quotas.

6. The method of claim 1, wherein the computing resource is a graph database.

7. An apparatus, comprising:
at least one processor; and
memory storing instructions that, when executed by the at least one processor, cause the apparatus to:
identify a computing resource having one or more associated quotas;
identify multiple clients that request access to the resource, wherein each client is identified with a combination of:
a name of a first service that processes a request for the resource; and
a name of another service that processes the request prior to delivery of the request to a gateway service that controls access to the resource;
cause a computer system to display a visualization interface comprising:
a first portion listing the one or more quotas associated with the resource, wherein the first portion comprises a first set of default quotas for a first set of the identified clients; and
a second portion displaying a configuration of a quota selected in the first portion; and
upon selection and reconfiguration by a user of a default quota for a first client, adding to the first portion of the visualization interface a first custom quota for the first client.

8. The apparatus of claim 7, wherein the first portion further comprises:
a default set of quotas for different sub-resources of the resource; and
a second set of custom quotas for a second set of the identified clients.

9. The apparatus of claim 7, wherein the second portion displays one or more sub-quotas of the selected quota and, for each sub-quota:
a type of the sub-quota;
a limit of the sub-quota; and
a duration of a time window during which a client's use of the resource is aggregated for comparison with the limit.

10. The apparatus of claim 9, wherein the type of each of the one or more sub-quotas is one of:
error rate;
exception rate;
memory usage;
latency; and
garbage collection.

11. The apparatus of claim 7, wherein:
one or more of the first portion and the second portion comprise a link to a third portion; and
the third portion comprises a graph depicting statuses of at least one quota.

12. The apparatus of claim 7, wherein the computing resource is a graph database.

13. A system, comprising:
a management module comprising a non-transitory computer-readable medium storing instructions that, when executed, cause the system to:
identify a computing resource having one or more associated quotas;
identify multiple clients that request access to the resource, wherein each client is identified with a combination of:
a name of a first service that processes a request for the resource; and
a name of another service that processes the request prior to delivery of the request to a gateway service that controls access to the resource;
cause a computer system to display a visualization interface comprising:
a first portion listing the one or more quotas associated with the resource, wherein the first portion comprises a first set of default quotas for a first set of the identified clients; and
a second portion displaying a configuration of a quota selected in the first portion; and
upon selection and reconfiguration by a user of a default quota for a first client, adding to the first portion of the visualization interface a first custom quota for the first client; and
a gateway comprising a non-transitory computer-readable medium storing instructions that, when executed, cause the system to enforce the one or more quotas associated with the resource.

14. The system of claim 13, wherein the first portion further comprises:
a default set of quotas for different sub-resources of the resource; and
a second set of custom quotas for a second set of the identified clients.

15. The system of claim 13, wherein the second portion displays one or more sub-quotas of the selected quota and, for each sub-quota:
a type of the sub-quota;
a limit of the sub-quota; and
a duration of a time window during which a client's use of the resource is aggregated for comparison with the limit.

16. The system of claim 15, wherein the type of each of the one or more sub-quotas is one of:
error rate;
exception rate;
memory usage;
latency; and
garbage collection.

17. The system of claim 13, wherein:
one or more of the first portion and the second portion comprise a link to a third portion; and
the third portion comprises a graph depicting statuses of one or more selected quotas.

18. The method of claim 5, wherein the graph reflects usage of the one or more selected quotas, for the resource, by one or more corresponding clients.

19. The apparatus of claim 11, wherein the graph reflects usage of the one or more selected quotas, for the resource, by one or more corresponding clients.

20. The system of claim 17, wherein the graph reflects usage of the one or more selected quotas, for the resource, by one or more corresponding clients.

* * * * *